US009929651B2

(12) United States Patent
Cannankurichi et al.

(10) Patent No.: US 9,929,651 B2
(45) Date of Patent: Mar. 27, 2018

(54) CONVERTER WITH HYSTERETIC CONTROL

(71) Applicant: Microsemi Corporation, Aliso Viejo, CA (US)

(72) Inventors: Naveen Cannankurichi, Hyderabad (IN); Sunny Joel, Hyderabad (IN); Paul Walker, Mission Viejo, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 0 days.

(21) Appl. No.: 15/346,820

(22) Filed: Nov. 9, 2016

(65) Prior Publication Data

US 2017/0141685 A1    May 18, 2017

(30) Foreign Application Priority Data

Nov. 18, 2015   (IN) .......................... 4338/MUM/2015

(51) Int. Cl.
*H02M 3/157*     (2006.01)
*H02M 3/158*     (2006.01)

(52) U.S. Cl.
CPC .................................. *H02M 3/158* (2013.01)

(58) Field of Classification Search
CPC ........ H02M 3/10; H02M 3/125; H02M 3/145; H02M 3/155; H02M 3/158; H02M 3/1588; H02M 3/1582; H02M 3/156; H02M 3/157; G05F 1/462; G05F 1/52; G05F 1/56
USPC ........ 323/265, 271, 282, 283, 284, 285, 351
See application file for complete search history.

(56) References Cited

U.S. PATENT DOCUMENTS

| 5,481,178 | A | * | 1/1996 | Wilcox | H02M 3/156 323/224 |
| 5,808,566 | A | | 9/1998 | Schwartz et al. | |
| 6,147,478 | A | | 11/2000 | Skelton et al. | |
| 7,457,140 | B2 | | 11/2008 | Klein | |
| 8,138,739 | B1 | * | 3/2012 | Eirea | H02M 3/1588 323/271 |
| 9,158,314 | B2 | * | 10/2015 | Kung | G05F 1/10 |
| 2005/0017703 | A1 | * | 1/2005 | Walters | H02M 3/156 323/288 |
| 2009/0009148 | A1 | | 1/2009 | Philbrick | |
| 2011/0101937 | A1 | * | 5/2011 | Dobkin | H02M 3/156 323/282 |

(Continued)

*Primary Examiner* — Adolf Berhane
(74) *Attorney, Agent, or Firm* — Simon Kahn (57) ABSTRACT

A hysteretic power converter constituted of: a switched mode power supply comprising an inductor, an electronically controlled switch and an output capacitor, the switch arranged to alternately open and close a loop with the inductor and a power source; a hysteretic comparator, a first input coupled to a feedback connection and arranged to receive from the feedback connection a feedback signal providing a first representation of the voltage across the output capacitor, the electronically controlled switch opened and closed responsive to an output of the hysteretic comparator; a reference voltage source arranged to generate a reference voltage, the generated reference voltage coupled to a second input of the hysteretic comparator; and a voltage coupler, the voltage coupler arranged to couple a second representation of the voltage across the output capacitor to the second input of the hysteretic comparator, such that the second representation is added to the generated reference voltage.

22 Claims, 6 Drawing Sheets

(56) References Cited

U.S. PATENT DOCUMENTS

| | | | |
|---|---|---|---|
| 2012/0249093 A1* | 10/2012 | Grbo | H02M 3/1588 |
| | | | 323/234 |
| 2012/0293145 A1* | 11/2012 | De Cremoux | H02M 1/14 |
| | | | 323/282 |
| 2013/0106385 A1 | 5/2013 | Smith, Jr. et al. | |
| 2015/0381037 A1* | 12/2015 | Romeo | H02M 3/156 |
| | | | 323/282 |

* cited by examiner

FIG. 1

*PRIOR ART*

CONVERTER WITH HYSTERETIC CONTROL

BACKGROUND OF THE INVENTION

The present invention relates to the field of power converters, and in particular to a hysteretic converter arranged to rapidly compensate for a load step.

Various schemes of controlling a DC to DC power converter are known. In a linear controlled power converter, one of the output voltage and output current are sensed and fedback to the controller via an error amplifier. A reference value, reflective of a target output, is further received by the error amplifier, and differences in output from the target output are detected and compensated for, typically by adjusting the amount of time that an electronically controlled switch is closed. In such an embodiment, the output voltage or current varies about the target output, and the average output over time may equal the target output. Such a linear regulation control however is inappropriate when a quick reaction to large changes in load is required.

In order to overcome this difficulty, a hysteretic converter is utilized. The hysteretic converter comprises at least one electronically controlled switch, a comparator and an inductor, the electronically controlled switch being closed responsive to the output of the comparator. The comparator is arranged to close the electronically controlled switch promptly responsive to the instantaneous output voltage falling below a first reference signal, thus driving the output voltage higher without the delay of an integrator or other low bandwidth circuitry. Various schemes for opening the electronically controlled switch exist, including, but not limited to, comparing the output voltage to a second reference and defining a predetermined fixed on time for the electronically controlled switch.

Figure 1:
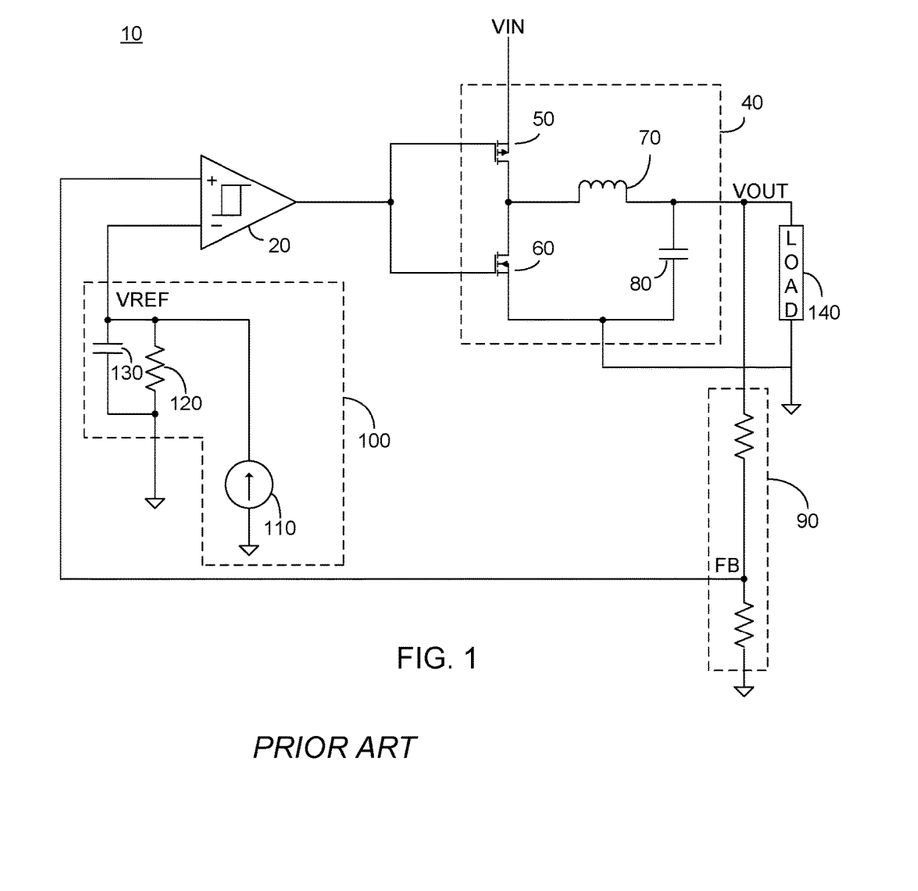
FIG. 1 illustrates a high level schematic diagram of a hysteretic converter according to the prior art.

FIG. 1 illustrates a high level schematic diagram of a hysteretic converter 10 of the prior art comprising: a hysteretic comparator 20 illustrated as a Schmidt trigger comparator; a switched mode power supply 40, illustrated without limitation as a buck converter constituted of a first electronically controlled switch 50 illustrated without limitation as a p-channel field-effect transistor (PFET), a second electronically controlled switch 60 illustrated without limitation as an n-channel field-effect transistor (NFET), an inductor 70 and an output capacitor 80; a voltage divider 90; a reference voltage circuitry 100, comprising a ramp current source 110, a resistor 120 and a capacitor 130. Additionally, a load 140 is further illustrated. An input voltage VIN is coupled to the source of PFET 50, and the drain of PFET 50 is coupled to a first end of inductor 70 and to the drain of NFET 60. A second end of inductor 70 is coupled to a first end of output capacitor 80 and to a first end of load 140, the voltage thereat denoted output voltage VOUT. A second end of load 140, a second end of output capacitor 80 and the source of NFET 60 are coupled to a common potential.

A predetermined portion of output voltage VOUT is further coupled to the non-inverting input of hysteretic comparator 20, via voltage divider 90, denoted feedback signal FB. The inverting input of hysteretic comparator 20 is coupled to a first end of each of capacitor 130, resistor 120 and ramp current source 110. A second end of each of ramp current source 110, resistor 120 and capacitor 130 is coupled to the common potential. The output of hysteretic comparator 20 is coupled to both the gate of PFET 50 and to the gate of NFET 60. Optionally, (not shown) a gate driving circuit is provided between the output of hysteretic comparator 20 and the gates of PFET 50 and NFET 60.

In operation, ramp current source 110 is arranged to generate a ramped current, which is converted to a reference voltage VREF by resistor 120 and capacitor 130. When feedback signal FB falls to less than the threshold value signal fed to the inverting input of hysteretic comparator 20, i.e. reference voltage VREF, hysteretic comparator 20 enables current flow through PFET 50, thus connecting inductor 70 to input voltage VIN and enabling current flow through inductor 70, defined as positive when flowing in the direction of output capacitor 80 and increasing over time thus increasing output voltage VOUT. When feedback signal FB is greater than reference voltage VREF, hysteretic comparator 20 enables current flow through NFET 60, thus connecting inductor 70 to the common potential and current flow through inductor 70 decreases over time thus decreasing output voltage VOUT. Hysteresis is provided by hysteretic comparator 20 to avoid instability.

The response of hysteretic converter 10 is quite fast. Unfortunately, during load step conditions at load 140 undershoot and overshoot can become very high, which is undesirable.

SUMMARY OF THE INVENTION

Accordingly, it is a principal object of the present invention to overcome at least some of the disadvantages of the prior art. This is provided in certain embodiments by a hysteretic power converter comprising: a switched mode power supply comprising an inductor, an electronically controlled switch and an output capacitor, the electronically controlled switch arranged to alternately open and close a loop with the inductor and a power source; a hysteretic comparator, a first input of the hysteretic comparator coupled to a feedback connection and arranged to receive from the feedback connection a feedback signal providing a first representation of the voltage across the output capacitor, the electronically controlled switch opened and closed responsive to an output of the hysteretic comparator; a reference voltage source arranged to generate a reference voltage, the generated reference voltage coupled to a second input of the hysteretic comparator; and a voltage coupler, the voltage coupler arranged to couple a second representation of the voltage across the output capacitor to the second input of the hysteretic comparator, such that the second representation is added to the generated reference voltage. In one embodiment, the coupling is responsive to a capacitance of the voltage coupler.

In one independent embodiment, a hysteretic power converter is provided, the hysteretic power converter comprising: a switched mode power supply comprising an inductor, an electronically controlled switch and an output capacitor, the electronically controlled switch arranged to alternately open and close a loop with the inductor and a power source; a hysteretic comparator, a first input of the hysteretic comparator coupled to a feedback connection and arranged to receive from the feedback connection a feedback signal providing a first representation of the voltage across the output capacitor, the electronically controlled switch opened and closed responsive to an output of the hysteretic comparator; and a reference voltage source arranged to generate a reference voltage, the generated reference voltage coupled to a second input of the hysteretic comparator, wherein the reference voltage source comprises: a current source; and an adjustable resistance, wherein the resistance of the adjustable resistance is adjusted responsive to a second representation of the voltage across the output capacitor.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. The term coupled as used herein is not meant to be limited to a direct connection, and the use of appropriate resistors, capacitors, inductors and other active and non-active elements does not exceed the scope thereof. In the accompanying drawings.

DETAILED DESCRIPTION OF PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2:
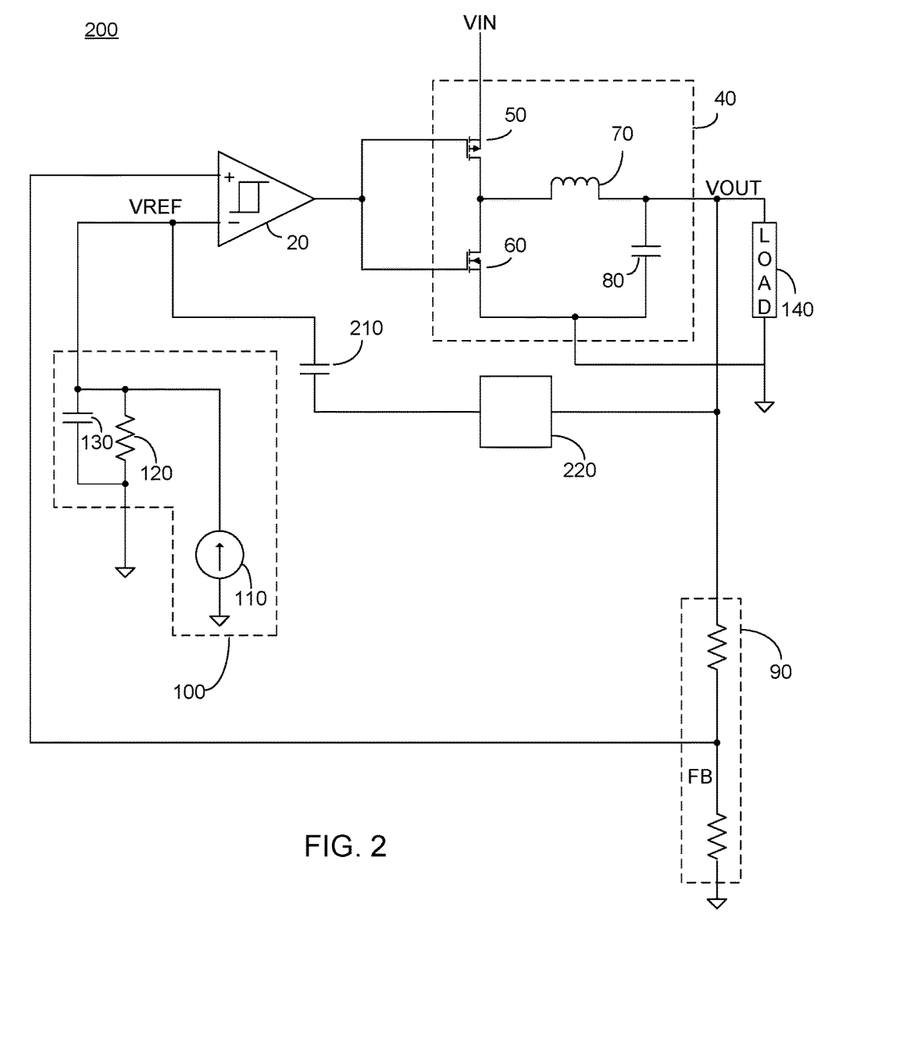
FIG. 2 illustrates a high level schematic diagram of a hysteretic converter comprising a voltage coupler, according to certain embodiments.

FIG. 2 illustrates a high level schematic diagram of an exemplary embodiment of a hysteretic converter 200, hysteretic converter 200 comprising: a hysteretic comparator 20 illustrated as a Schmidt trigger comparator; a switched mode power supply 40, illustrated without limitation as a buck converter constituted of a PFET 50, an NFET 60, an inductor 70 and an output capacitor 80; a voltage divider 90; a reference voltage circuitry 100, comprising a ramp current source 110, a resistor 120 and a capacitor 130; a voltage coupler 210, illustrated and described herein as a capacitor; and a division circuitry 220. Additionally, a load 140 is further illustrated. An input voltage VIN is coupled to the source of PFET 50, and the drain of PFET 50 is coupled to a first end of inductor 70 and to the drain of NFET 60. A second end of inductor 70 is coupled to a first end of output capacitor 80 and to a first end of load 140; the voltage thereat denoted output voltage VOUT. A second end of load 140, a second end of output capacitor 80 and the source of NFET 60 are coupled to a common potential.

A predetermined portion of output voltage VOUT is further coupled to the non-inverting input of hysteretic comparator 20, via voltage divider 90. The inverting input of hysteretic comparator 20 is coupled to a first end of each of capacitor 130, resistor 120, ramp current source 110 and capacitor 210. A second end of each of ramp current source 110, resistor 120 and capacitor 130 is coupled to the common potential. A second end of capacitor 210 is coupled to an output of division circuitry 220 and an input of division circuitry 220 is coupled to output voltage VOUT. The output of hysteretic comparator 20 is coupled to both the gate of PFET 50 and to the gate of NFET 60. Optionally, (not shown) a gate driving circuit is provided between the output of hysteretic comparator 20 and the gates of PFET 50 and NFET 60.

In operation, ramp current source 110 is arranged to generate a ramped current, which is converted to a reference voltage VREF by resistor 120 and capacitor 130. Reference voltage VREF is further biased by output voltage VOUT, via division circuitry 220 and capacitor 210. Particularly, an inverted predetermined portion of output voltage VOUT, is output by division circuitry 220 and added to reference voltage VREF.

When feedback signal FB falls sharply to less than the threshold value signal fed to the inverting input of hysteretic comparator 20, i.e. reference voltage VREF, due to a step, or other sharp decrease in the resistance of load 140, hysteretic comparator 20 enables current flow through PFET 50, thus connecting inductor 70 to input voltage VIN and enabling current flow through inductor 70, defined as positive when flowing in the direction of output capacitor 80 and increasing over time thus increasing output voltage VOUT. Additionally, the voltage at the output of division circuitry 220 sharply increases, which sharp change passes through capacitor 210, thereby increasing reference voltage VREF. As a result, the negative difference between feedback signal FB and VREF increases thus increasing the duty cycle of switched mode power supply 40, i.e. the on-time of PFET 50 is increased.

When feedback signal FB rises sharply to greater than reference voltage VREF, due to a step, or other sharp increase in the resistance of load 140, hysteretic comparator 20 enables current flow through NFET 60, thus connecting inductor 70 to the common potential and current flow through inductor 70 decreases over time thus decreasing output voltage VOUT. Additionally, the voltage at the output of division circuitry 220 sharply decreases, which sharp decrease passes though capacitor 210 thereby decreasing reference voltage VREF. As a result, the positive difference between feedback signal FB and VREF increases thus reducing the duty cycle of switched mode power supply 40, i.e. the off-time of PFET 50 is increased. Hysteresis is provided by hysteretic comparator 20 to avoid instability.

The addition of capacitor 210 and division circuitry 220, which provides an inverted portion of output voltage VOUT to reference voltage VREF, significantly increases the speed in which hysteretic converter 200 stabilizes output voltage VOUT responsive to a step, or other sharp change, in load 140. During load step conditions at load 140, the overshoot or undershoot of output voltage VOUT is thus rapidly compensated for.

Figure 3:
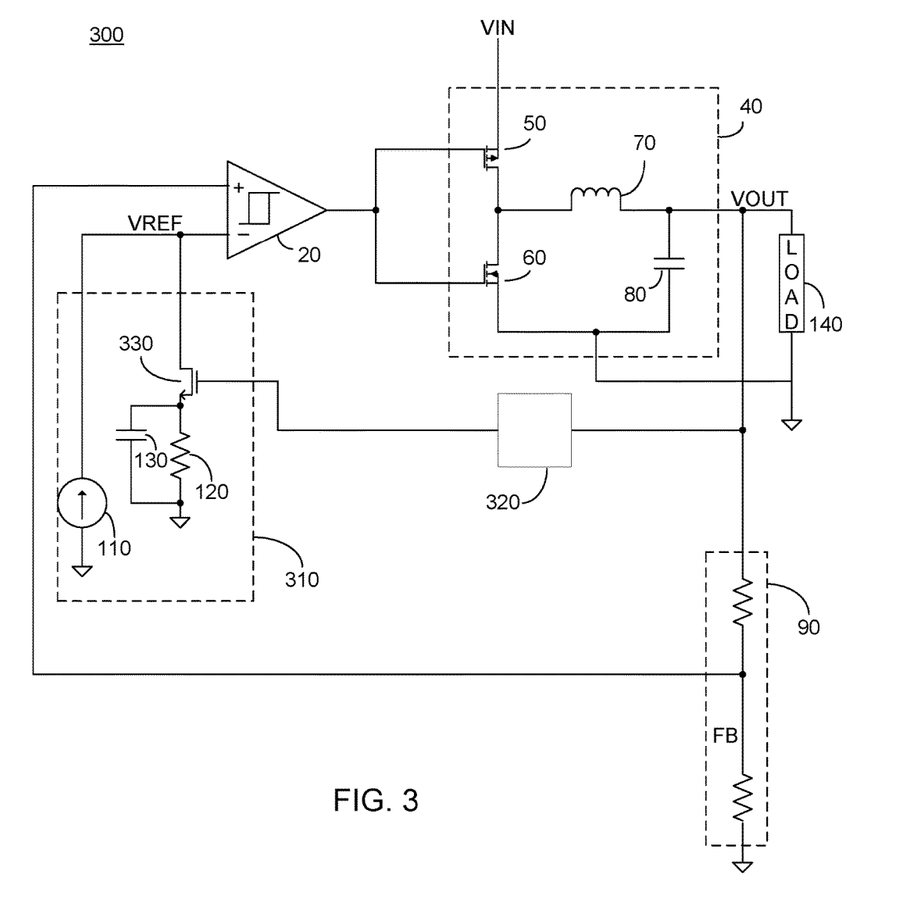
FIG. 3 illustrates a high level schematic diagram of a hysteretic converter comprising an adjustable resistance, according to certain embodiments.

FIG. 3 illustrates a high level schematic diagram of an exemplary embodiment of a hysteretic converter 300, hysteretic converter 300 comprising: a hysteretic comparator 20 illustrated as a Schmidt trigger comparator; a switched mode power supply 40, illustrated without limitation as a buck converter constituted of a PFET 50, an NFET 60, an inductor 70 and an output capacitor 80; a voltage divider 90; a reference voltage circuitry 310; and a division circuitry 320. Reference voltage circuitry 310 comprises: a ramp current source 110; a resistor 120; a capacitor 130; and an adjustable resistance 330. Additionally, a load 140 is further illustrated. Adjustable resistance 330 is illustrated and described herein as an NFET, however this is not meant to be limiting in any way and any suitable adjustable resistance can be used without exceeding the scope. An input voltage VIN is coupled to the source of PFET 50, and the drain of PFET 50 is coupled to a first end of inductor 70 and to the drain of NFET 60. A second end of inductor 70 is coupled to a first end of output capacitor 80 and to a first end of load 140; the voltage thereat denoted output voltage VOUT. A second end of load 140, a second end of output capacitor 80 and the source of NFET 60 are coupled to a common potential.

A predetermined portion of output voltage VOUT is further coupled to the non-inverting input of hysteretic comparator 20, via voltage divider 90. The inverting input of hysteretic comparator 20 is coupled to the drain of NFET 330 and a first end of ramp current source 110. The source of NFET 330 is coupled a first end of each of resistor 120 and capacitor 130. A second end of each of ramp current source 110, resistor 120 and capacitor 130 is coupled to the common potential. The gate of NFET 330 is coupled to an output of division circuitry 320 and an input of division circuitry 320 is coupled to output voltage VOUT. The output of hysteretic comparator 20 is coupled to both the gate of PFET 50 and to the gate of NFET 60. Optionally, (not shown) a gate driving circuit is provided between the output of hysteretic comparator 20 and the gates of PFET 50 and NFET 60.

In operation, ramp current source 110 is arranged to generate a ramped current, which is converted to a reference voltage VREF by the resistance of NFET 330, resistor 120 and capacitor 130. When feedback signal FB falls to less than the threshold value signal fed to the inverting input of hysteretic comparator 20, i.e. reference voltage VREF, hysteretic comparator 20 enables current flow through PFET 50, thus connecting inductor 70 to input voltage VIN and enabling current flow through inductor 70, defined as positive when flowing in the direction of output capacitor 80 and increasing over time thus increasing output voltage VOUT. Additionally, division circuitry 320 is arranged to output a predetermined portion of output voltage VOUT. The voltage at the output of division circuitry 320 decreases, thereby reducing the size of the channel of NFET 330 effectively increasing the resistance of NFET 330 and thus increasing reference voltage VREF. As a result, the negative difference between feedback signal FB and VREF increases and the negative output of hysteretic comparator 20 is further amplified thus increasing the duty cycle of switched mode power supply 40.

When feedback signal FB is greater than reference voltage VREF, hysteretic comparator 20 enables current flow through NFET 60, thus connecting inductor 70 to the common potential and current flow through inductor 70 decreases over time thus decreasing output voltage VOUT. Additionally, the voltage at the output of division circuitry 320 increases, thereby increasing the size of the channel of NFET 330 effectively reducing the resistance of NFET 330 and decreasing reference voltage VREF. As a result, the positive difference between feedback signal FB and VREF increases and the positive output of hysteretic comparator 20 is further amplified thus reducing the duty cycle of switched mode power supply 40. Hysteresis is provided by hysteretic comparator 20 to avoid instability.

The addition of NFET 330 and division circuitry 320, which provides a negative portion of output voltage VOUT to reference voltage VREF, significantly increases the speed in which hysteretic converter 200 stabilizes output voltage VOUT. During load step conditions at load 140, the overshoot or undershoot of output voltage VOUT is rapidly compensated for.

Figure 4:
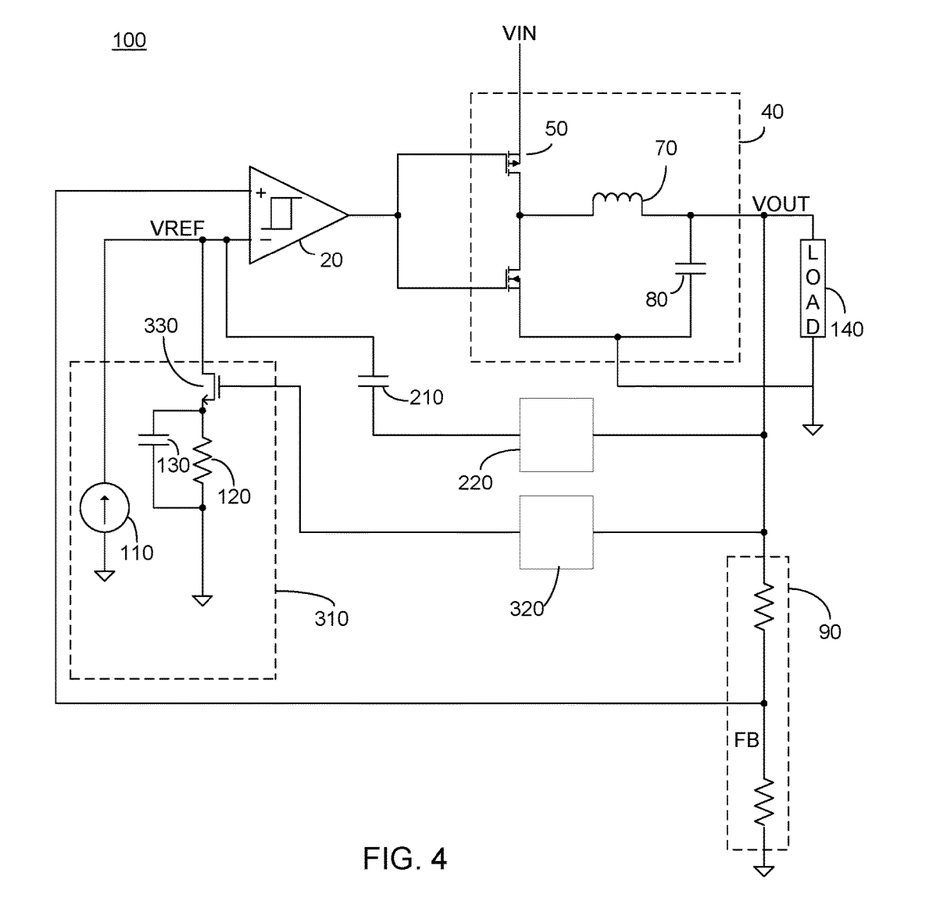
FIG. 4 illustrates a high level schematic diagram of a hysteretic converter comprising both the voltage coupler of FIG. 2 and the adjustable resistance of FIG. 3, according to certain embodiments.

FIG. 4 illustrates a high level schematic diagram of a hysteretic converter 400. Hysteretic converter 400 is in all respects similar to hysteretic converter 300 of FIG. 3 with the addition of capacitor 210 and division circuitry 220, as described above in relation to hysteretic converter 200 of FIG. 2. Particularly, capacitor 210 is coupled between the inverting input of hysteretic comparator 20 and an output of division circuitry 220 and an input of division circuitry 220 is coupled to output voltage VOUT.

In operation, ramp current source 110 is arranged to generate a ramped current, which is converted to a reference voltage VREF by the resistance of NFET 330, resistor 120 and capacitor 130. Reference voltage VREF is further biased by output voltage VOUT, via division circuitry 220 and capacitor 210. Particularly, a predetermined inverted portion of output voltage VOUT is output by division circuitry 220 and added to reference voltage VREF.

When feedback signal FB falls to less than the threshold value signal fed to the inverting input of hysteretic comparator 20, i.e. reference voltage VREF, hysteretic comparator 20 enables current flow through PFET 50, thus connecting inductor 70 to input voltage VIN and enabling current flow through inductor 70, defined as positive when flowing in the direction of output capacitor 80 and increasing over time thus increasing output voltage VOUT. Additionally, division circuitry 320 is arranged to output a predetermined portion of output voltage VOUT. The voltage at the output of division circuitry 320 decreases, thereby increasing the effective resistance of NFET 330 and increasing reference voltage VREF. As a result, the negative difference between feedback signal FB and VREF increases thus increasing the duty cycle of switched mode power supply 40. Furthermore, the voltage at the output of division circuitry 220 increases, which for sharp changes passes through capacitor 210 further increasing reference voltage VREF. As a result, the negative difference between feedback signal FB and VREF increases more thus further increasing the duty cycle of switched mode power supply 40.

When feedback signal FB is greater than reference voltage VREF, hysteretic comparator 20 enables current flow through NFET 60, thus connecting inductor 70 to the common potential and current flow through inductor 70 decreases over time thus decreasing output voltage VOUT. Additionally, the voltage at the output of division circuitry 320 increases, thereby reducing the effective resistance of NFET 330 and decreasing reference voltage VREF. As a result, the positive difference between feedback signal FB and VREF increases thus reducing the duty cycle of switched mode power supply 40. Furthermore, the voltage at the output of division circuitry 220 decreases, which for sharp changes passes through capacitor 210 thereby further decreasing reference voltage VREF. As a result, the positive difference between feedback signal FB and VREF increases thus further reducing the duty cycle of switched mode power supply 40. Hysteresis is provided by hysteretic comparator 20 to avoid instability.

The addition of NFET 330 and capacitor 210, and the respective division circuitries 320, 220, significantly increases the speed in which hysteretic converter 200 stabilizes output voltage VOUT. During load step conditions at load 140, the overshoot or undershoot of output voltage VOUT is rapidly compensated for.

Figure 5:
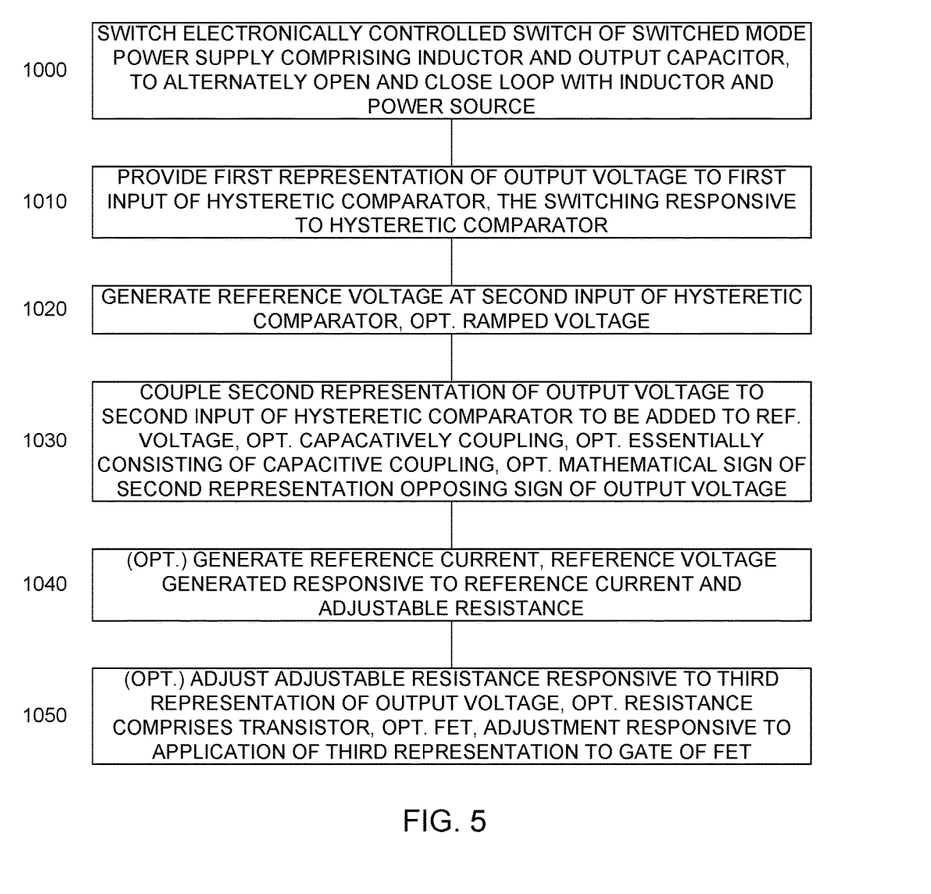
FIG. 5 illustrates a high level flow chart of a first hysteretic conversion method, according to certain embodiments.

FIG. 5 illustrates a high level flow chart of a first hysteretic conversion method. In stage 1000, an electronically controlled switch of a switched mode power supply is switched, the switched mode power supply comprising an inductor and an output capacitor. The switching of the electronically controlled switch alternately opens and closes a loop with the inductor and a power source. Optionally, a half-bridge circuit is provided, the half-bridge circuit switched to alternately open and close the loop with the inductor and the power source.

In stage 1010, a first representation of the voltage across the output capacitor is provided to a first input of a hysteretic comparator, the switching of stage 1000 responsive to an output of the hysteretic comparator. In stage 1020, a reference voltage is generated at a second input of the hysteretic comparator of stage 1010. Optionally, the generated reference voltage is a ramped voltage. In stage 1030, a second representation of the voltage across the output capacitor of stage 1000 is coupled to the second input of the hysteretic comparator, such that the second representation of the voltage across the output capacitor is added to the generated reference voltage. Optionally, the coupling to the second input of the hysteretic comparator comprises capacitively coupling the second representation of the voltage across the output capacitor to the second input of the hysteretic comparator. Further optionally, the coupling essentially consists of capacitively coupling the second representation of the voltage across the output capacitor to the second input of the hysteretic comparator, i.e. the coupling is accomplished essentially only with a capacitor. Optionally, the mathematical sign of the second representation of the voltage across the output capacitor opposes the mathematical sign of the voltage across the output capacitor.

In optional stage 1040, a reference current is generated, the reference voltage of stage 1020 generated responsive to the generated reference current and responsive to an adjustable resistance. In optional stage 1050, the resistance of the adjustable resistance is adjusted responsive to a third representation of the voltage across the output capacitor. Optionally, the adjustable resistance comprises a transistor. Further optionally, the transistor comprises a field-effect transistor, the resistance adjustment responsive to an application of the third representation of the voltage across the output capacitor to a gate of the field-effect transistor.

Figure 6:
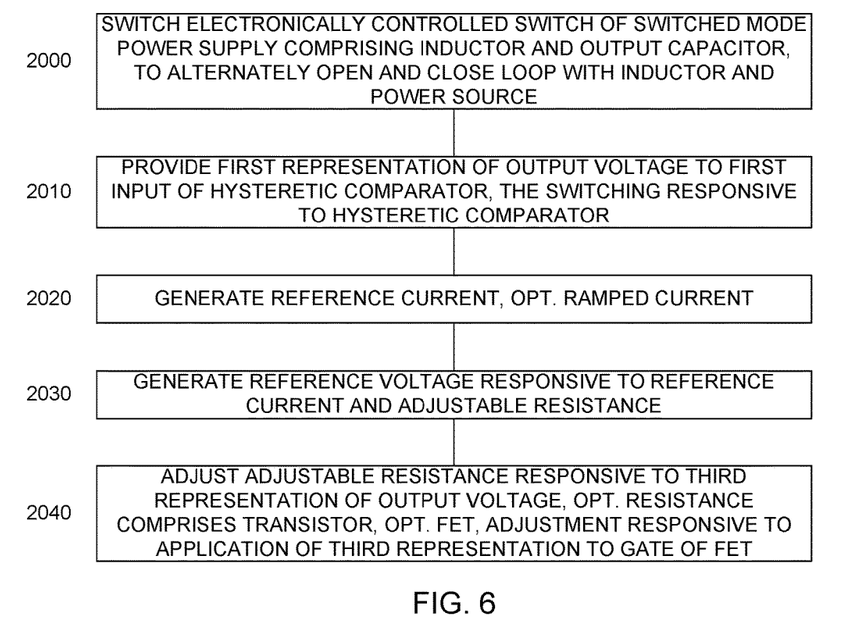
FIG. 6 illustrates a high level flow chart of a second hysteretic conversion method, according to certain embodiments.

FIG. 6 illustrates a high level flow chart of a second hysteretic conversion method. In stage 2000, an electronically controlled switch of a switched mode power supply is switched, the switched mode power supply comprising an inductor and an output capacitor. The switching of the electronically controlled switch alternately opens and closes a loop with the inductor and a power source. Optionally, a half-bridge circuit is provided the half-bridge circuit switched to alternately open and close the loop with the inductor and the power source.

In stage 2010, a first representation of the voltage across the output capacitor is provided to a first input of a hysteretic comparator, the switching of stage 2000 responsive to an output of the hysteretic comparator. In stage 2020, a reference current is generated. Optionally, the generated reference current is a ramped current. In stage 2030, a reference voltage is generated responsive to the generated reference current of stage 2020 and responsive to an adjustable resistance.

In stage 2040, the resistance of the adjustable resistance of stage 2030 is adjusted responsive to a second representation of the voltage across the output capacitor. Optionally, the adjustable resistance comprises a transistor. Further optionally, the transistor comprises a field-effect transistor, the resistance adjustment responsive to an application of the third representation of the voltage across the output capacitor to a gate of the field-effect transistor.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

We claim:

1. A hysteretic power converter comprising:
    a switched mode power supply comprising an inductor, an electronically controlled switch and an output capacitor, said electronically controlled switch arranged to alternately open and close a loop with said inductor and a power source;
    a hysteretic comparator, a first input of said hysteretic comparator coupled to a feedback connection and arranged to receive from the feedback connection a feedback signal providing a first representation of the voltage across said output capacitor, said electronically controlled switch opened and closed responsive to an output of said hysteretic comparator;
    a reference voltage source arranged to generate a reference voltage, said generated reference voltage coupled to a second input of said hysteretic comparator; and
    a voltage coupler, said voltage coupler arranged to couple a second representation of the voltage across said output capacitor to said second input of said hysteretic comparator, such that said second representation is added to said generated reference voltage, wherein the mathematical sign of said second representation opposes the mathematical sign of the voltage across said output capacitor.

2. The hysteretic power converter of claim 1, wherein said coupling is responsive to a capacitance of said voltage coupler.

3. The hysteretic power converter of claim 1, wherein said voltage coupler comprises a capacitor.

4. The hysteretic power converter of claim 1, wherein said voltage coupler consists essentially of a capacitor.

5. The hysteretic power converter of claim 1, wherein said generated reference voltage exhibits a ramped voltage.

6. A hysteretic power converter comprising:
a switched mode power supply comprising an inductor, an electronically controlled switch and an output capacitor, said electronically controlled switch arranged to alternately open and close a loop with said inductor and a power source;
a hysteretic comparator, a first input of said hysteretic comparator coupled to a feedback connection and arranged to receive from the feedback connection a feedback signal providing a first representation of the voltage across said output capacitor, said electronically controlled switch opened and closed responsive to an output of said hysteretic comparator;
a reference voltage source arranged to generate a reference voltage, said generated reference voltage coupled to a second input of said hysteretic comparator; and
a voltage coupler, said voltage coupler arranged to couple a second representation of the voltage across said output capacitor to said second input of said hysteretic comparator, such that said second representation is added to said generated reference voltage,
wherein said reference voltage source comprises:
a current source; and
an adjustable resistance,
wherein the resistance of said adjustable resistance is adjusted responsive to a third representation of the voltage across said output capacitor.

7. The hysteretic power converter of claim 6, wherein the mathematical sign of said second representation opposes the mathematical sign of the voltage across said output capacitor.

8. The hysteretic power converter of claim 6, wherein said adjustable resistance comprises a transistor.

9. The hysteretic power converter of claim 8, wherein said transistor comprises a field-effect transistor, said resistance adjustment responsive to an application of said third representation to a gate of said field-effect transistor.

10. A hysteretic power converter comprising:
a switched mode power supply comprising an inductor, an electronically controlled switch and an output capacitor, said electronically controlled switch arranged to alternately open and close a loop with said inductor and a power source;
a hysteretic comparator, a first input of said hysteretic comparator coupled to a feedback connection and arranged to receive from the feedback connection a feedback signal providing a first representation of the voltage across said output capacitor, said electronically controlled switch opened and closed responsive to an output of said hysteretic comparator; and a reference voltage source arranged to generate a reference voltage, said generated reference voltage coupled to a second input of said hysteretic comparator,
wherein said reference voltage source comprises:
a current source; and
an adjustable resistance,
wherein the resistance of said adjustable resistance is adjusted responsive to a second representation of the voltage across said output capacitor.

11. The hysteretic power converter of claim 10, wherein said adjustable resistance comprises a transistor.

12. The hysteretic power converter of claim 11, wherein said transistor comprises a field-effect transistor, said resistance adjustment responsive to an application of said third representation to a gate of said field-effect transistor.

13. A hysteretic power conversion method, the method comprising:
switching an electronically controlled switch of a switched mode power supply comprising an inductor and an output capacitor to alternately open and close a loop with the inductor and a power source;
providing a first presentation of the voltage across the output capacitor to a first input of a hysteretic comparator said switching responsive to an output of the hysteretic comparator;
generating a reference voltage at a second input of the hysteretic comparator; and
coupling a second representation of the voltage across the output capacitor to the second input of said hysteretic comparator, such that the second representation is added to said generated reference voltage,
wherein the mathematical sign of the second representation opposes the mathematical sign of the voltage across the output capacitor.

14. The method of claim 13, wherein said coupling comprises capacitively coupling the second representation to the second input of the hysteretic comparator.

15. The method of claim 13, wherein said coupling essentially consists of capacitively coupling the second representation to the second input of the hysteretic comparator.

16. The method of claim 13, wherein said generated reference voltage exhibits a ramped voltage.

17. A hysteretic power conversion method, the method comprising:
switching an electronically controlled switch of a switched mode power supply comprising an inductor and an output capacitor to alternately open and close a loop with the inductor and a power source;
providing a first presentation of the voltage across the output capacitor to a first input of a hysteretic comparator said switching responsive to an output of the hysteretic comparator;
generating a reference voltage at a second input of the hysteretic comparator;
coupling a second representation of the voltage across the output capacitor to the second input of said hysteretic comparator, such that the second representation is added to said generated reference voltage;
generating a reference current, said reference voltage generated responsive to said generated reference current and an adjustable resistance; and
adjusting the resistance of the adjustable resistance responsive to a third representation of the voltage across the output capacitor.

18. The method of claim 17, wherein the mathematical sign of the second representation opposes the mathematical sign of the voltage across the output capacitor.

19. The method of claim 17, wherein the adjustable resistance comprises a transistor.

20. The method of claim 19, wherein the transistor comprises a field-effect transistor, said resistance adjustment responsive to an application of said third representation to a gate of the field-effect transistor.

21. A hysteretic power conversion method, the method comprising:
   switching an electronically controlled switch of a switched mode power supply comprising an inductor and an output capacitor to alternately open and close a loop with the inductor and a power source;
   providing a first presentation of the voltage across the output capacitor to a first input of a hysteretic comparator said switching responsive to an output of the hysteretic comparator;
   generating a reference current;
   generating a reference voltage responsive to said generated reference current and an adjustable resistance, wherein the adjustable resistance comprises a transistor; and
   adjusting the resistance of the adjustable resistance responsive to a second representation of the voltage across the output capacitor.

22. The method of claim 21, wherein the transistor comprises a field-effect transistor, said resistance adjustment responsive to an application of said third representation to a gate of the field-effect transistor.

* * * * *